(12) United States Patent
Prazeres et al.

(10) Patent No.: US 9,446,720 B1
(45) Date of Patent: Sep. 20, 2016

(54) ADJUSTABLE BRACKET FOR MOUNTING AN ELECTRONIC MEDIA DEVICE IN A VEHICLE

(71) Applicant: GM GLOBAL TECHNOLOGY OPERATIONS LLC, Detroit, MI (US)

(72) Inventors: Christopher D. Prazeres, Sao Bernardo do Campo (BR); Antonio M. Quadros, São Paulo (BR); Wiliam Maeda, São Paulo (BR); Joao Claudio Brito Santos, Centro—São Bernado do Campo (BR)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/684,373

(22) Filed: Apr. 11, 2015

(51) Int. Cl.
| | |
|---|---|
| *B60R 11/02* | (2006.01) |
| *B60R 7/06* | (2006.01) |
| *B62D 25/14* | (2006.01) |
| *B60R 11/00* | (2006.01) |

(52) U.S. Cl.
CPC .............. *B60R 11/0252* (2013.01); *B60R 7/06* (2013.01); *B60R 11/02* (2013.01); *B60R 11/0258* (2013.01); *B62D 25/14* (2013.01); *B60R 2011/0005* (2013.01); *B60R 2011/0082* (2013.01); *B60R 2011/0094* (2013.01)

(58) Field of Classification Search
CPC ........... B60R 7/06; B60R 7/08; B60R 11/02; B60R 11/0252; B60R 11/0258; B62D 25/14
USPC ....................................... 296/37.8, 37.12, 70
See application file for complete search history.

(56) References Cited

U.S. PATENT DOCUMENTS

| | | | |
|---|---|---|---|
| 6,354,649 B1 | 3/2002 | Lee | |
| 7,900,988 B2 * | 3/2011 | Ryu | ................... B60R 11/0235 224/483 |
| 8,157,311 B2 | 4/2012 | Fowler | |
| 8,827,222 B2 | 9/2014 | Jacobson | |
| 2009/0296006 A1 | 12/2009 | Campbell et al. | |
| 2013/0058014 A1 | 3/2013 | King, II | |
| 2013/0286555 A1 | 10/2013 | Jensen | |
| 2014/0354002 A1 * | 12/2014 | Bisceglia | ................ B60R 11/02 296/37.12 |

* cited by examiner

*Primary Examiner* — Jason S Daniels
(74) *Attorney, Agent, or Firm* — Dierker & Kavanaugh, P.C.

(57) ABSTRACT

An adjustable bracket for mounting an electronic media device (EMD) in a vehicle includes a rigid housing mountable to an instrument panel substrate. A linear rail is fixedly attached to the housing. A lower arm is pivotally connected to the housing and rotatable between a lower arm stowed position with the lower arm parallel to the rail and a lower arm extended position with the lower arm perpendicular to the rail. An upper arm assembly is adjustably connected to the rail and has a hinged upper arm rotatable between an upper arm stowed position with the upper arm parallel to the rail and an upper arm extended position with the upper arm perpendicular to the rail. In the respective extended positions, the lower arm and the upper arm are to engage and retain the EMD with an EMD display visible to an occupant of the vehicle during vehicle operation.

18 Claims, 7 Drawing Sheets

ADJUSTABLE BRACKET FOR MOUNTING AN ELECTRONIC MEDIA DEVICE IN A VEHICLE

BACKGROUND

Electronic media devices such as smartphones and tablet computers are usable in many locations. Such electronic media devices programmed for various applications provide useful information, communication, and entertainment. In some cases, electronic media devices provide services that may be useful or desirable to an occupant or driver of a vehicle. For example, some smartphones have a Global Position System (GPS) based navigation system application that displays route information on an interactive dynamic map display. Music or other audio programming may be stored and played on a smartphone or tablet computer. It may be convenient to mount the electronic media device so that the display is visible and the controls are accessible from a seated position in the vehicle.

SUMMARY

An adjustable bracket for mounting an electronic media device (EMD) in a vehicle includes a rigid housing mountable to an instrument panel substrate. A linear rail is fixedly attached to the housing. A lower arm is pivotally connected to the housing and rotatable between a lower arm stowed position with the lower arm parallel to the rail, and a lower arm extended position with the lower arm perpendicular to the rail. An upper arm assembly is adjustably connected to the rail and has a hinged upper arm rotatable between an upper arm stowed position with the upper arm parallel to the rail and an upper arm extended position with the upper arm perpendicular to the rail. In the respective extended positions, the lower arm and the upper arm are to engage and retain the EMD with an EMD display visible to an occupant of the vehicle during vehicle operation.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

The present disclosure relates to an adjustable mounting bracket for mounting an electronic media device in a vehicle. The electronic media device may be, for example, a smartphone or a tablet computer. As used herein, an electronic media device means a portable electronic device, having a graphical user interface display and controls. Non-limiting examples of electronic media devices include Apple iPhone®, iPad®, iPad® Mini, and Samsung Galaxy S5®. As used herein, an electronic media device need not have all of the functionality of a smartphone. For example, a Magellan® GPS navigation system, a Personal Data Assistant (PDA) and an iPod® are electronic media devices as defined herein. The mounting bracket of the present disclosure is not for mounting a laptop or notebook computer, except if the notebook computer is a convertible notebook computer in tablet mode or a hybrid laptop computer in tablet mode. A convertible laptop computer is a laptop computer that folds into a tablet computer. The screen swivels around and folds back down, turning the machine into a rectangular slate. In tablet mode, the convertible laptop is heavier and thicker than an iPad or Android tablet. The convertible laptop computer has a screen/display that remains on the unit, whereas the screen on a hybrid laptop is removed to become the tablet.

The adjustable mounting bracket of the present disclosure is built into the vehicle, providing styling and functionality that is coordinated with the vehicle. Although various aftermarket brackets exist, they generally interfere with functions of the vehicles in which they are mounted. For example, a bracket that is anchored in the cup-holder at least temporarily takes away the ability of the cup holder to hold cups. A bracket that anchors in an HVAC (heating, ventilation and air conditioning) vent interferes with HVAC. The existing brackets may mount using suction cups on the windshield and interfere with defroster flow. Existing brackets may hold the electronic media device in a position that obscures or interferes with access to controls/buttons/knobs for radio, climate control, lighting, hazard lights, etc. In sharp contrast, the adjustable mounting bracket of the present disclosure does not hold the electronic media device in a position that occludes visibility of, or interferes with, any control device in the vehicle.

Figure 1:
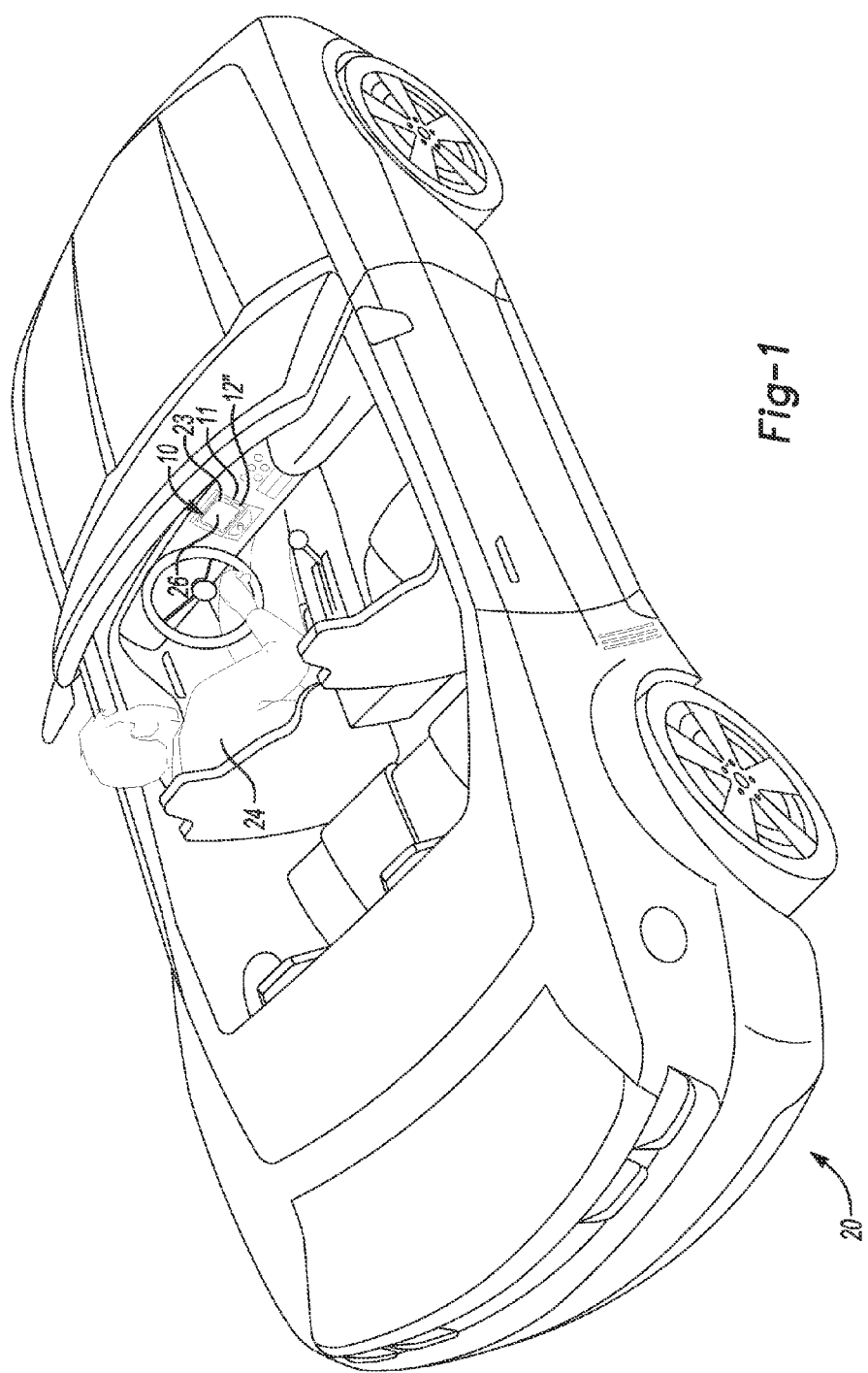
FIG. 1 is a semi-schematic rear perspective view depicting a vehicle with an example of an adjustable bracket for mounting an electronic media device in the vehicle according to the present disclosure.
Figure 2:
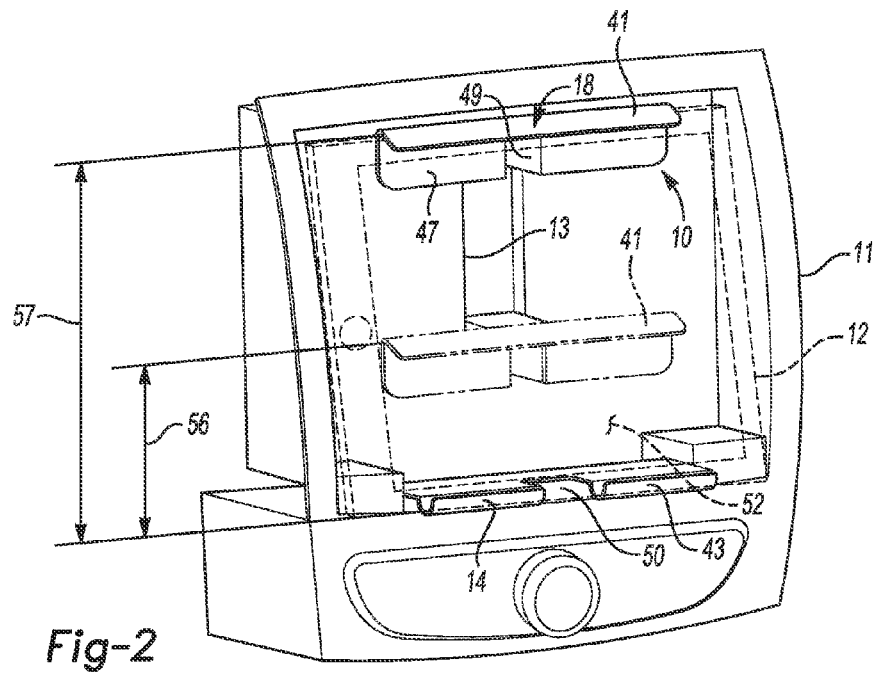
FIG. 2 is a semi-schematic perspective view depicting an example of an adjustable bracket for mounting an electronic media device in a vehicle according to the present disclosure.

FIG. 1 is a semi-schematic rear perspective view depicting a vehicle 20 with an example of an adjustable bracket 10 for mounting an EMD 12" in the vehicle 20 according to the present disclosure. In FIG. 1, a rigid housing 11 of the adjustable bracket 10 is depicted with a large EMD 12" mounted with an electronic media device display 23 visible to an occupant 24 of the vehicle 20 during vehicle operation. FIG. 2 is a semi-schematic perspective view depicting an example of the adjustable bracket 10 for mounting an EMD 12 in a vehicle 20 according to the present disclosure. In an example depicted in FIGS. 2-6, the adjustable bracket 10 includes the rigid housing 11 mountable to an instrument panel substrate 21. A linear rail 13 is fixedly attached to the housing 11. A lower arm 14 is pivotally connected to the housing 11. The lower arm 14 is rotatable between a lower arm stowed position 15 (see FIG. 4) with the lower arm 14 parallel to the rail 13, and a lower arm extended position 16 with the lower arm 14 perpendicular to the rail 13 (see FIG. 3). An upper arm assembly 17 is adjustably connected to the rail 13. The upper arm assembly 17 has a hinged upper arm 18 rotatable between an upper arm stowed position 19 (see FIG. 4) with the upper arm 18 parallel to the rail 13, and an upper arm extended position 22 with the upper arm 18 perpendicular to the rail 13. In the respective extended positions 16 and 22, the lower arm 14 and the upper arm 18 are to engage and retain the EMD 12 with the electronic media device display 23 visible to an occupant 24 of the vehicle 20 during vehicle operation.

Figure 3:
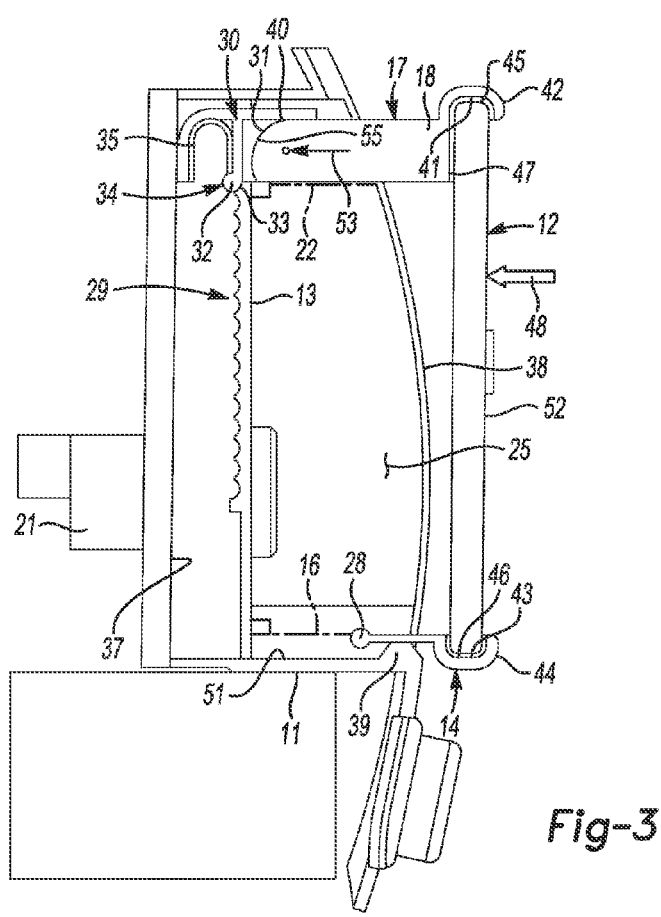
FIG. 3 is a semi-schematic side view depicting an example of an instrument panel with an adjustable bracket with a large electronic media device engaged and retained by the adjustable bracket according to the present disclosure.
Figure 4:
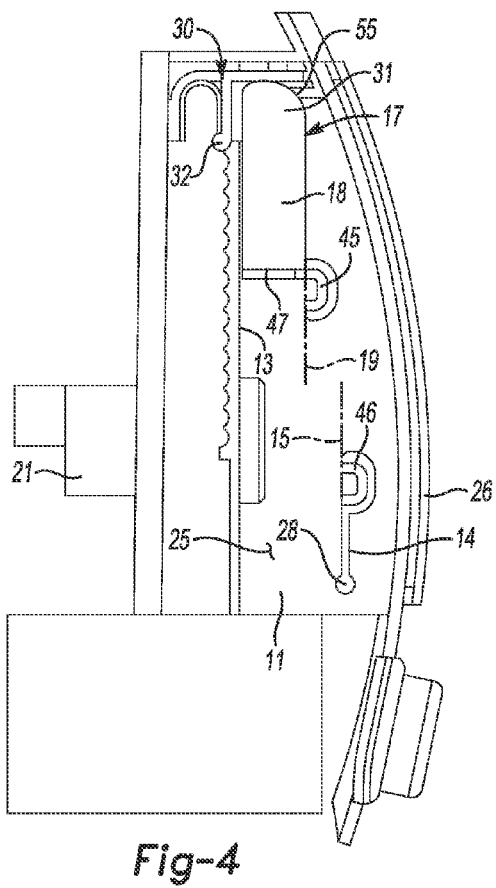
FIG. 4 is a semi-schematic side view depicting an example of an instrument panel with an adjustable bracket with the upper arm in the upper arm stowed position and the lower arm in the lower arm stowed position and the removable cover installed according to the present disclosure.

As depicted in FIGS. 3 and 4, a cavity 25 is defined by the housing 11. The hinged upper arm 18 in the upper arm stowed position 19 is within the cavity 25 and the lower arm 14 in the lower arm stowed position 15 is within the cavity 25. When the hinged upper arm 18 is in the upper arm stowed position 19 and the lower arm 14 is in the lower arm stowed position 15, the removable cover panel 26 can be installed to cover the cavity 25. As used herein, "hinged upper arm 18 within the cavity 25", and "the lower arm 14 within the cavity 25" mean when the removable cover panel 26 is installed to cover the cavity 25, the hinged upper arm 18 and the lower arm 14 do not contact or protrude through the removable cover panel 26.

A lower hinge 28 has the lower arm 14 articulatably attached thereto. A plurality of detents 29 is disposed on the rail 13. The upper arm assembly 17 includes a carriage 30 adjustably attached to the rail 13. The carriage 30 has the upper arm 18 articulatably attached thereto at an upper hinge 31. An anchor tooth 32 is defined on the carriage 30 to selectably engage a selectable detent 33 in the plurality of detents 29. The selectable detent 33 corresponds to a selectable location 34 of the carriage 30 with respect to the rail 13.

In the example depicted in FIGS. 3 and 4, an anchor spring 35 may be disposed on the carriage 30 to urge the anchor tooth 32 toward engagement with the selectable detent 33. The anchor spring 35 is to be overcome by a selective application of a predetermined release force 53 applied via the upper arm 18 perpendicular to the rail 13 thereby to cause the upper arm assembly 17 to be slidable along the rail 13. The predetermined release force 53 compresses the anchor spring 35, thereby disengaging the anchor tooth 32 from the selectable detent 33 in the plurality of detents 29. As depicted in FIGS. 3 and 4, the anchor spring 35 has a "U" shaped cross-section; however, in other examples of the present disclosure, the anchor spring 35 may be a helical spring or a resilient block (not shown).

An anterior wall 37 is defined by the housing 11 opposite an opening 38 of the cavity 25. A lower wall 51 extends between the anterior wall 37 and the opening 38 of the cavity 25. A lower rotation stop 39 is defined by the lower wall 51 to limit the rotation of the lower arm 14 to an angle of about 90 degrees corresponding to the lower arm extended position 16. An upper rotation stop 40 is defined by the carriage 30 to limit the rotation of the upper arm 18 to an angle of about 90 degrees corresponding to the upper arm extended position 22. In the example depicted in FIGS. 3 and 4, the upper arm 18 has an eccentric curved surface 55 that only contacts the carriage 30 when the upper arm 18 is in the upper arm extended position 22.

An upper retention slot 41 is defined at a retainer end 42 of the upper arm 18 opposite the upper hinge 31. The upper retention slot 41 is wide enough to accept an edge of the EMD 12. In this paragraph, "wide" means the dimension from front to back that accepts the smallest linear dimension of the EMD 12. In an example, the upper retention slot 41 may be from about 6 mm to about 12 mm wide. A lower retention slot 43 is defined at a receiver end 44 of the lower arm 14 opposite the lower hinge 28. The lower retention slot 43 is wide enough to accept an edge of the EMD 12. In an example, the lower retention slot 43 may be from about 6 mm to about 12 mm wide. The upper retention slot 41 and the lower retention slot 43 are parallel to hold the EMD 12 therebetween.

As an example of adjusting the upper arm assembly 17, the user 54 may grasp the upper arm 18 and push forward on the upper arm 18 in the vehicle 20 to release the anchor tooth 32 from the plurality of detents 29. Next, the user may slide the upper arm assembly 17 up or down to a position that corresponds to a size of the EMD 12. In an example, visible markings may be made on the housing to aid the user in adjusting the upper arm for a particular model. For example, a mark may be made for a position corresponding to an iPad®, or a Samsung Galaxy S5®. After the user slides the upper arm assembly 17 to the position that corresponds to the EMD 12, releasing the upper arm assembly 17 allows the anchor spring 35 to move the anchor tooth 32 into the nearest selectable detent 33 in the plurality of detents 29, thereby securing the upper arm assembly in place until another adjustment is made by the user 54.

In an example of the present disclosure, an upper resilient liner 45 is disposed on the upper retention slot 41. A lower resilient liner 46 is disposed on the lower retention slot 43. The upper resilient liner 45 and the lower resilient liner 46 are to cushion the EMD 12 when the EMD 12 is held between the upper retention slot 41 and the lower retention slot 43. In an example, the upper resilient liner 45 and the lower resilient liner 46 may be made from EVA (Ethylene-Vinyl Acetate) foam. The upper resilient liner 45 and the lower resilient liner 46 may have an unstressed thickness of around 3 mm and be soft enough to avoid scratching the EMD 12 while still rendering sufficient support to prevent rattles during vehicle 20 operation.

In an example, the upper resilient liner 45 and the lower resilient liner 46 may be formed from a flexible, expanded rubber material having a range of compression deflection from about 2 kPa (kilopascals) to about 5 kPa. The compression deflection value is to be determined after 1 minute of a single 50% compression on unplied material (no preflex) after being compressed at a rate of 50 millimeters/minute (mm/min). Specimens of the expanded rubber material for the compression deflection test are 50 mm×50 mm with a minimum specimen thickness of about 3.2 mm. All adhesive surfaces are to be dusted with talc to prevent adhesion to the compression plates in the test apparatus.

A backstop 47 may be defined on the upper arm 18 to support the EMD 12 without permanent deformation of the backstop 47 against a force 48 applied to use a touch screen 52 of the EMD 12. In an example, the force 48 may be less than about 5 Newtons. A first cable pass-through slot 49 may be defined in the upper arm 18. A second cable pass-through slot 50 may be defined in the lower arm 14. The cable pass through may be convenient for routing, for example, a USB cable or a power cable. However, the EMD 12 may be used wirelessly, without connecting the EMD 12 with wires or cables in the vehicle.

In an example of the present disclosure, the upper retention slot 41 and the lower retention slot 43 are adjustably spaced from a first distance 56 of about 40 millimeters (mm) to a second distance 57 of about 200 mm apart (see FIG. 2). In another example, the upper retention slot 41 and the lower retention slot 43 are adjustably spaced from the first distance 56 of about 40 mm to the second distance 57 of about 150 mm apart.

Figure 5:
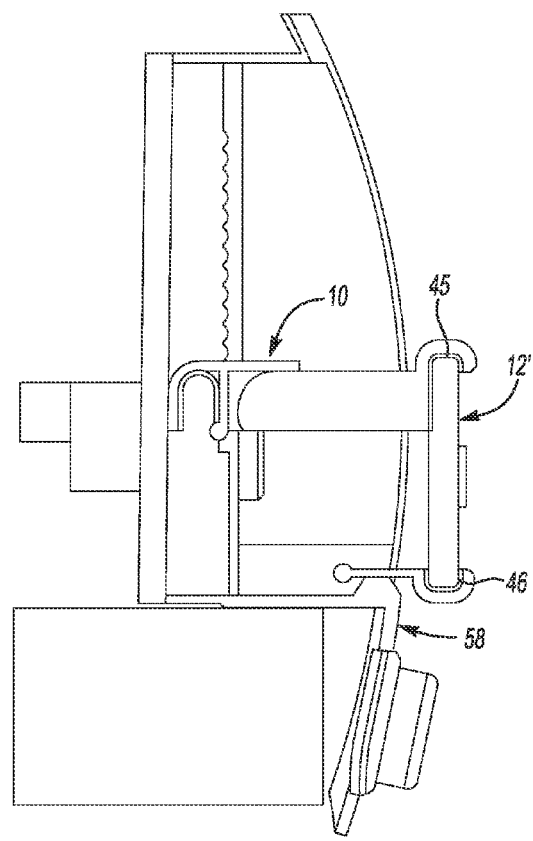
FIG. 5 is a semi-schematic side view depicting the example of the instrument panel with the adjustable bracket depicted in FIG. 4 with a small electronic media device engaged and retained by the adjustable bracket according to the present disclosure.

FIG. 5 is a semi-schematic side view depicting the example of the instrument panel 58 with the adjustable bracket 10 depicted in FIG. 4 with a small EMD 12' engaged and retained by the adjustable bracket 10 according to the present disclosure.

Figure 6:
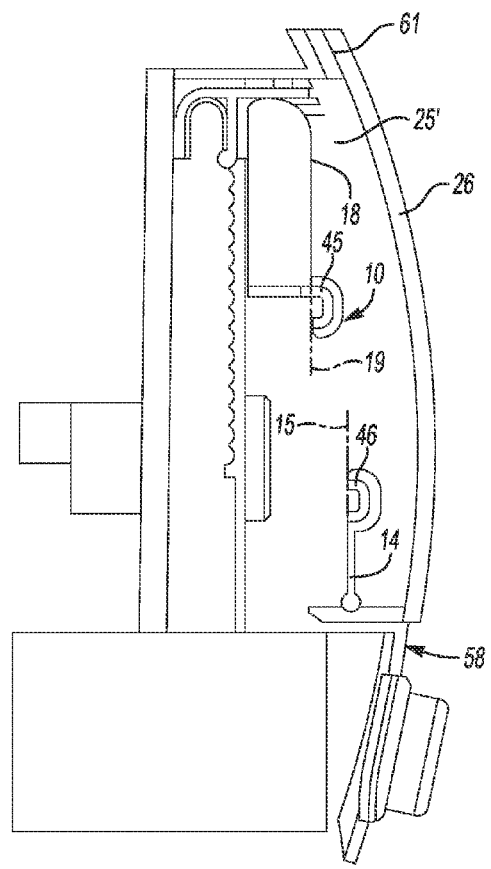
FIG. 6 is a semi-schematic side view depicting the example of an instrument panel with the adjustable bracket directly attached to the instrument panel, with the upper arm in the upper arm stowed position and the lower arm in the lower arm stowed position according to the present disclosure.

FIG. 6 is a semi-schematic side view depicting the example of the instrument panel 58 with the adjustable bracket 10 directly attached to the instrument panel 58, with the upper arm 18 in the upper arm stowed position 19 and the lower arm 14 in the lower arm stowed position 15 according to the present disclosure.

Figure 7:
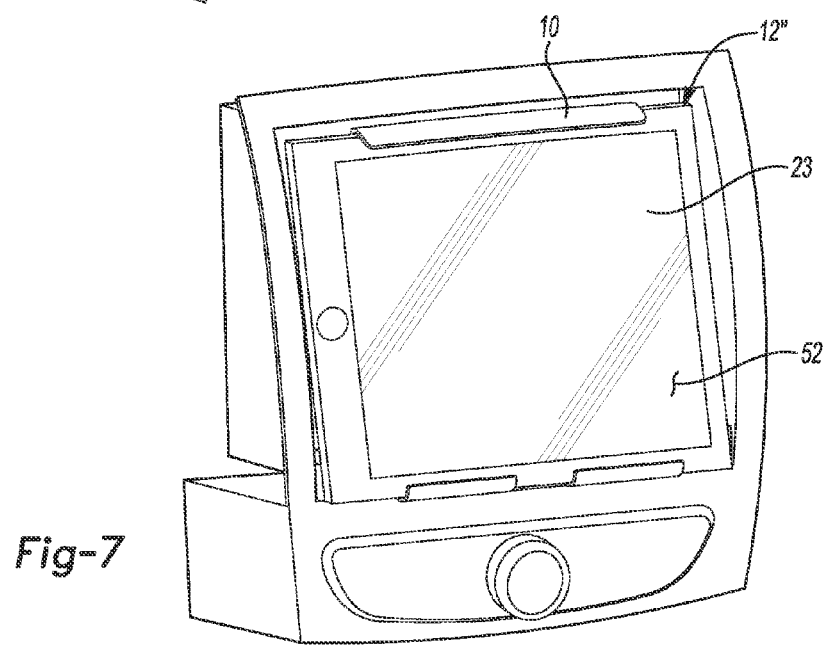
FIG. 7 is a semi-schematic perspective view depicting the example shown in FIG. 2 with a large electronic media device engaged and retained by the adjustable bracket according to the present disclosure.

FIG. 7 is a semi-schematic perspective view depicting the example shown in FIG. 2 with a large EMD 12" engaged and retained by the adjustable bracket 10 according to the present disclosure. The large EMD 12" may have an electronic media device display 23 that is visible to an occupant 24 of the vehicle 20 during vehicle operation. Further, when the EMD 12" is engaged and retained by the adjustable bracket 10 according to the present disclosure, the EMD 12" and particularly, the electronic media device display 23 may be accessible by the occupant 24 sitting in a seat of the vehicle 20. The seat may be a passenger seat or a driver seat. As used herein, "accessible" means that the occupant 24 may touch controls of the EMD 12, 12', 12" to manipulate functions of the EMD 12, 12', 12". For example, an EMD 12" may have a Graphical User Interface implemented as a touch screen 52. While it may also be possible to control the EMD 12, 12', 12" without contacting the EMD 12, 12', 12" (for example by voice commands), the present disclosure is for making the EMD 12, 12', 12" accessible as defined above.

Figure 8:
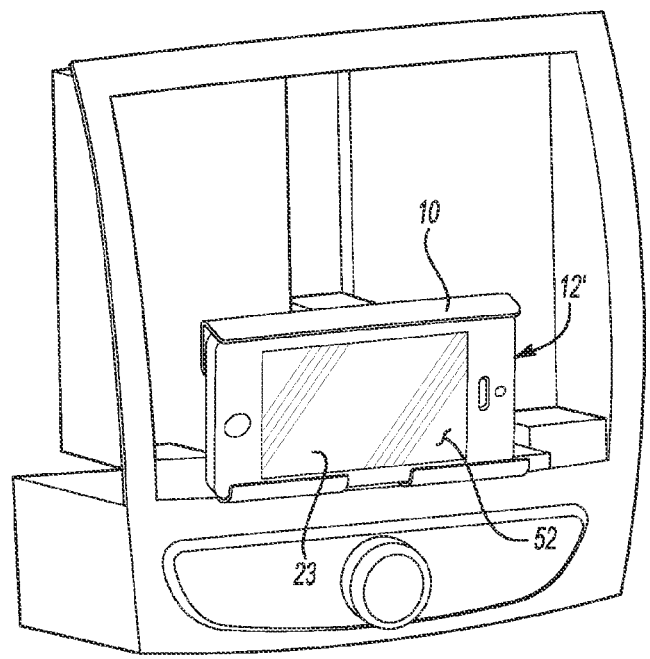
FIG. 8 is a semi-schematic perspective view depicting the example shown in FIG. 2 with a small electronic media device engaged and retained by the adjustable bracket according to the present disclosure.

FIG. 8 is a semi-schematic perspective view depicting the example shown in FIG. 2 with a small EMD 12' engaged and retained by the adjustable bracket 10 according to the present disclosure. Similar to the large EMD 12", the small EMD 12' may have an electronic media device display 23 that is visible to an occupant 24 of the vehicle 20 during vehicle operation. Further, when the small EMD 12' is engaged and retained by the adjustable bracket 10 according to the present disclosure, the small EMD 12' and particularly, the electronic media device display 23 may be accessible by the occupant 24 sitting in a seat of the vehicle 20. The seat may be a passenger seat or a driver seat.

Figure 9:
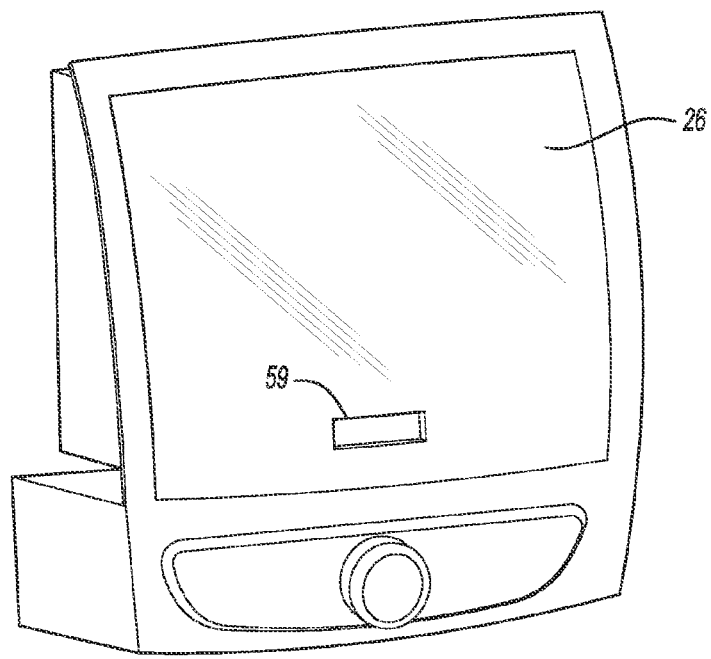
FIG. 9 is a semi-schematic perspective view depicting the example shown in FIG. 2 with a removable cover panel covering a cavity defined in a housing according to the present disclosure.

FIG. 9 is a semi-schematic perspective view depicting the example shown in FIG. 2 with a removable cover panel 26 covering a cavity 25 defined in the housing according to the present disclosure. A recessed finger grip 59 may be disposed in the removable cover panel 26 to ease removal of the removable cover panel 26 from the housing 11. For example, a finger may be inserted into the recessed finger grip 59 to pull the removable cover panel 26 away from the housing 11. The removable cover panel 26 may be stowable in a storage compartment (not shown) of the vehicle 20.

Figure 10:
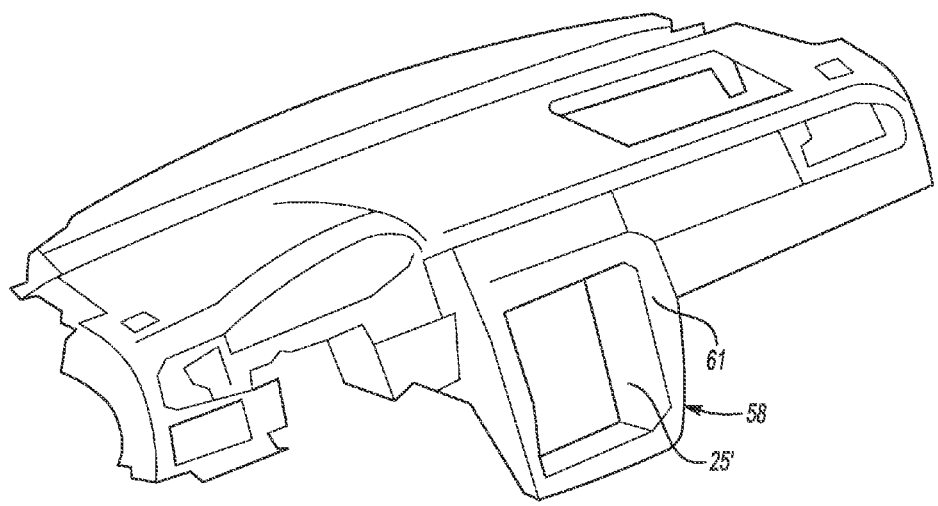
FIG. 10 is a semi-schematic perspective view depicting an example of an instrument panel according to the present disclosure.

FIG. 10 is a semi-schematic perspective view depicting an example of the instrument panel 58 according to the present disclosure. The instrument panel 58 depicted in FIG. 10 does not show the adjustable bracket 10. As disclosed herein, the bracket 10 may mounted on the instrument panel 58 with, or without a separate housing 11. The instrument panel 58 includes the instrument panel substrate 21 shown in FIG. 11. The linear rail 13 is fixedly attached to the instrument panel substrate 21. In an example, the linear rail 13 may be fixedly attached to the instrument panel substrate 21 via the housing 11 as indicated in FIG. 12. In other examples, the linear rail 13 may be directly attached to the instrument panel substrate 21. In examples in which the adjustable bracket 10 is directly attached to the instrument panel 58, i.e. without a separate housing 11, the cavity 25' may be defined in a visible surface 61 of in the instrument panel 58. The visible surface 61 of the instrument panel 58 is directly visible to the occupant 24 of the vehicle 20 when the occupant 24 is sitting in a seat of the vehicle 20. The visible surface 61 of the instrument panel 58 may be partially occluded by the removable cover panel 26. The seat may be a passenger seat or a driver seat. Although the vehicle 20 depicted in FIG. 1 is in a left drive configuration, it is to be understood that examples of the present disclosure may be included in right drive, dual-controlled and driverless vehicles.

Figure 11:
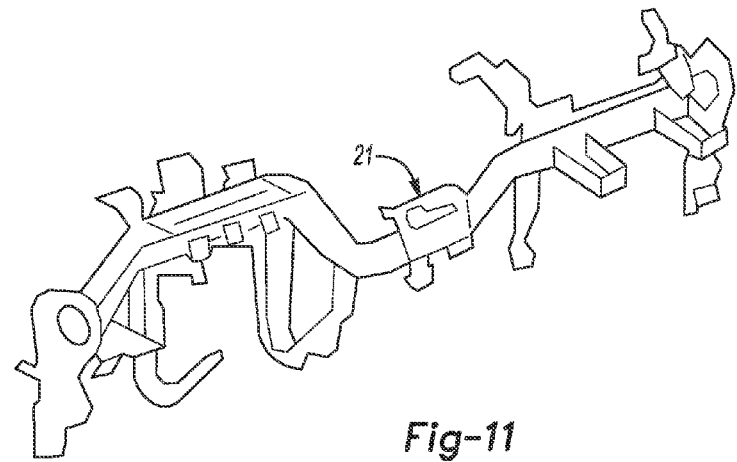
FIG. 11 is a semi-schematic perspective view depicting an example of an instrument panel substrate according to the present disclosure.
Figure 12:
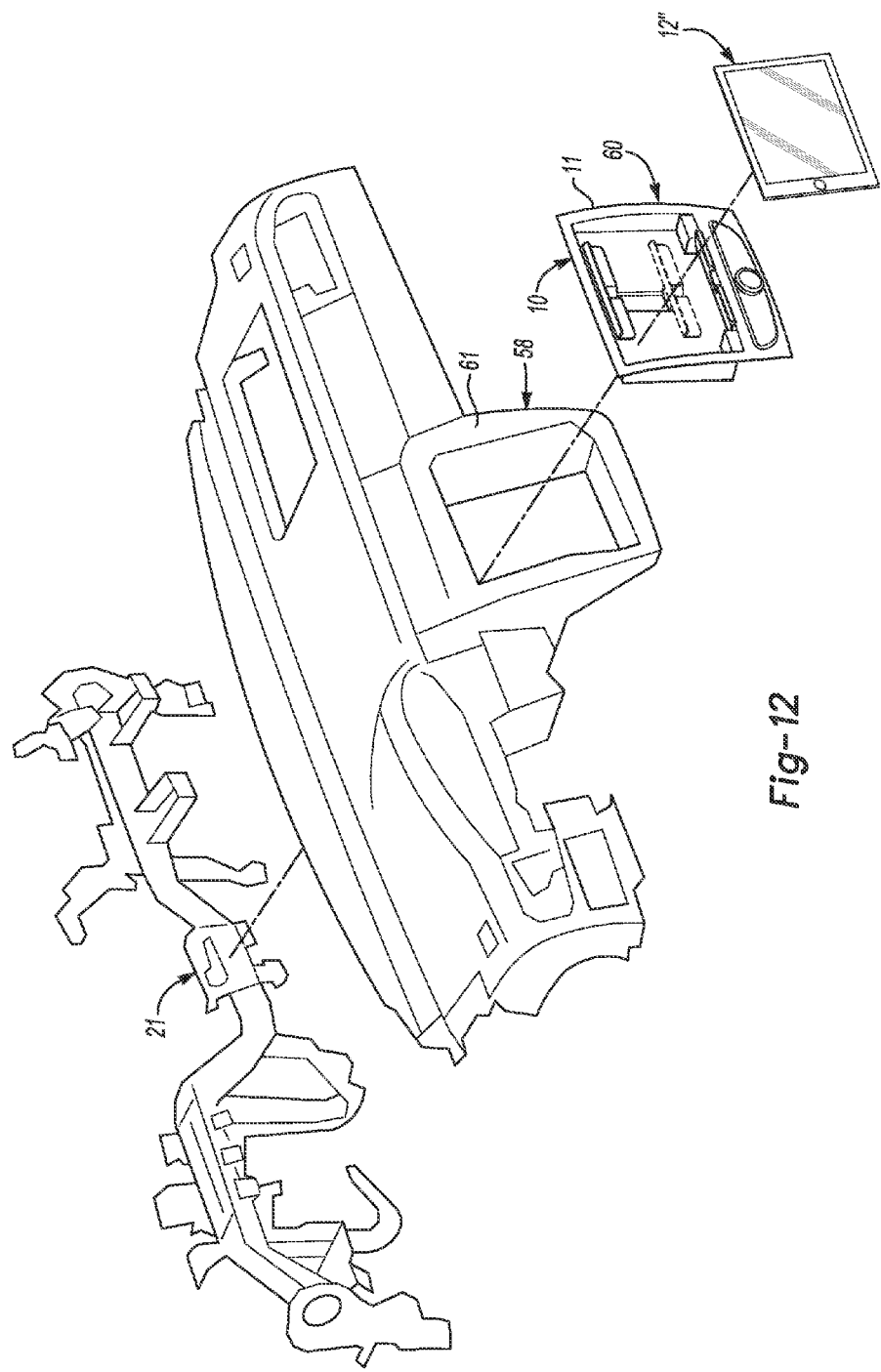
FIG. 12 is a semi-schematic exploded perspective view depicting an example of an instrument panel with an adjustable bracket according to the present disclosure.

FIG. 11 is a semi-schematic perspective view depicting an example of the instrument panel substrate 21 according to the present disclosure. FIG. 12 is a semi-schematic exploded perspective view depicting an example of an instrument panel 58 with an adjustable bracket 10 according to the present disclosure. In the example depicted in FIG. 12, the adjustable bracket 10 includes a housing 11 that is separable from the instrument panel 58. In other words, the adjustable bracket 10 shown is an adjustable bracket module 60 that may ease final assembly of the vehicle 20.

It is to be understood that the ranges provided herein include the stated range and any value or sub-range within the stated range. For example, a range from about 6 mm to about 12 mm should be interpreted to include not only the explicitly recited limits of about 6 mm and about 12 mm, but also to include individual values, such as 7 mm, 8.5 mm, 9.2 mm etc., and sub-ranges, such as from about 7 mm to about 11 mm, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Furthermore, reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it is to be understood that the disclosed examples may be modified. Therefore, the foregoing description is to be considered non-limiting.

What is claimed is:

1. An adjustable bracket for mounting an electronic media device (EMD) in a vehicle, comprising:
    a rigid housing mountable to an instrument panel substrate;
    a linear rail fixedly attached to the housing;
    a lower arm pivotally connected to the housing, the lower arm rotatable between a lower arm stowed position with the lower arm parallel to the rail and a lower arm extended position with the lower arm perpendicular to the rail;
    an upper arm assembly adjustably connected to the rail; the upper arm assembly having a hinged upper arm rotatable between an upper arm stowed position with the upper arm parallel to the rail and an upper arm extended position with the upper arm perpendicular to the rail wherein in the respective extended positions, the lower arm and the upper arm are to engage and retain the EMD with an EMD display visible to an occupant of the vehicle during operation of the vehicle;
    a lower hinge having the lower arm articulatably attached thereto;
    a plurality of detents disposed on the rail;
    the upper arm assembly including a carriage adjustably attached to the rail, the carriage having the upper arm articulatably attached thereto at an upper hinge; and
    an anchor tooth defined on the carriage to selectably engage a selectable detent in the plurality of detents wherein the selectable detent corresponds to a selectable location of the carriage with respect to the rail.

2. The adjustable bracket as defined in claim 1, further comprising:
    a cavity defined by the housing, wherein the hinged upper arm in the upper arm stowed position is within the cavity and the lower arm in the lower arm stowed position is within the cavity; and
    a removable cover panel to cover the cavity.

3. The adjustable bracket as defined in claim 1, further comprising:
    an anchor spring disposed on the carriage to urge the anchor tooth toward engagement with the selectable detent wherein the anchor spring is to be overcome by a selective application of a predetermined release force applied via the upper arm perpendicular to the rail thereby to cause the upper arm assembly to be slidable along the rail.

4. The adjustable bracket as defined in claim 1, further comprising:
    an anterior wall defined by the housing opposite an opening of the cavity;
    a lower wall extending between the anterior wall and the opening of the cavity;
    a lower rotation stop defined by the lower wall to limit the rotation of the lower arm to an angle of about 90 degrees corresponding to the lower arm extended position; and
    an upper rotation stop defined by the carriage to limit the rotation of the upper arm to an angle of about 90 degrees corresponding to the upper arm extended position.

5. The adjustable bracket as defined in claim 1, further comprising:
    an upper retention slot defined at a retainer end of the upper arm opposite the upper hinge; and
    a lower retention slot defined at a receiver end of the lower arm opposite the lower hinge wherein the upper retention slot and the lower retention slot are parallel to hold the EMD therebetween.

6. The adjustable bracket as defined in claim 5, further comprising:
    an upper resilient liner disposed on the upper retention slot; and
    a lower resilient liner disposed on the lower retention slot wherein the upper resilient liner and the lower resilient liner are to cushion the EMD when the EMD is held between the upper retention slot and the lower retention slot.

7. The adjustable bracket as defined in claim 5, further comprising a backstop defined on the upper arm to support the EMD without permanent deformation of the backstop against a force applied to use a touch screen of the EMD wherein the force is less than about 5 Newtons.

8. The adjustable bracket as defined in claim 7, further comprising:
    a first cable pass-through slot defined in the upper arm; and
    a second cable pass-through slot defined in the lower arm.

9. The adjustable bracket as defined in claim 5 wherein the upper retention slot and the lower retention slot are adjustably spaced from about 40 millimeters (mm) to about 200 mm apart.

10. An instrument panel for a vehicle, comprising:
    an instrument panel substrate;
    a linear rail fixedly attached to the substrate;
    a lower arm pivotally connected to the substrate, the lower arm rotatable between a lower arm stowed position with the lower arm rotated parallel to the rail and a lower arm extended position with the lower arm rotated perpendicular to the rail;
    an upper arm assembly adjustably connected to the rail, the upper arm assembly having a hinged upper arm rotatable between an upper arm stowed position with the upper arm rotated parallel to the rail and an upper arm extended position with the upper arm rotated perpendicular to the rail wherein in the respective extended positions, the lower arm and the upper arm are to engage an electronic media device (EMD) having a display to retain the media device with the display visible to an occupant of the vehicle during operation of the vehicle;
    a lower hinge having the lower arm articulatably attached thereto;
    a plurality of detents disposed on the rail;

the upper arm assembly including a carriage adjustably attached to the rail, the carriage having the upper arm articulatably attached thereto at an upper hinge; and an anchor tooth defined on the carriage to selectably engage a selectable detent in the plurality of detents wherein the selectable detent corresponds to a selectable location of the carriage with respect to the rail.

11. The instrument panel as defined in claim 10, further comprising:

a cavity defined in a visible surface of the instrument panel, wherein the hinged upper arm in the upper arm stowed position is within the cavity and the lower arm in the lower arm stowed position is within the cavity; and a removable cover panel to cover the cavity.

12. The instrument panel as defined in claim 10, further comprising:

an anchor spring disposed on the carriage to urge the anchor tooth toward engagement with the selectable detent wherein the anchor spring is to be overcome by a selective application of a predetermined release force applied via the upper arm perpendicular to the rail thereby to cause the upper arm assembly to be slidable along the rail.

13. The instrument panel as defined in claim 10, further comprising:

a housing defining an anterior wall opposite an opening of the cavity;

a lower wall extending between the anterior wall and the visible surface;

a lower rotation stop defined by the lower wall to limit the rotation of the lower arm to an angle of about 90 degrees corresponding to the lower arm extended position; and an upper rotation stop defined by the carriage to limit the rotation of the upper arm to an angle of about 90 degrees corresponding to the upper arm extended position.

14. The instrument panel as defined in claim 10, further comprising:

an upper retention slot defined at a retainer end of the upper arm opposite the upper hinge; and a lower retention slot defined at a receiver end of the lower arm opposite the lower hinge wherein the upper retention slot and the lower retention slot are parallel to hold the EMD therebetween.

15. The instrument panel as defined in claim 14, further comprising:

a upper resilient liner disposed on the upper retention slot; and a lower resilient liner disposed on the lower retention slot wherein the upper resilient liner and the lower resilient liner are to cushion the EMD when the EMD is held between the upper retention slot and the lower retention slot.

16. The instrument panel as defined in claim 14, further comprising a backstop defined on the upper arm to support the EMD without permanent deformation of the backstop against a force applied to use a touch screen of the EMD wherein the force is less than about 5 Newtons.

17. The instrument panel as defined in claim 16, further comprising:

a first cable pass-through slot defined in the upper arm; and a second cable pass-through slot defined in the lower arm.

18. The instrument panel as defined in claim 14 wherein the upper retention slot and the lower retention slot are adjustably spaced from about 40 millimeters (mm) to about 200 mm apart.

* * * * *